United States Patent [19]

Khungar et al.

[11] 4,355,142

[45] Oct. 19, 1982

[54] METHOD FOR HOMOGENIZING MONOMER MIXES FOR VINYL LATEX PRODUCTION

[75] Inventors: Sohan L. Khungar, Houston, Tex.; Suresh R. Shah, Sheffield Lake, Ohio

[73] Assignee: The B. F. Goodrich Company, Akron, Ohio

[21] Appl. No.: 238,919

[22] Filed: Feb. 27, 1981

[51] Int. Cl.³ .............................................. C08F 2/22
[52] U.S. Cl. ...................................... 526/88; 526/72
[58] Field of Search .................... 260/29.6 R; 526/72; 526/88

[56] References Cited

U.S. PATENT DOCUMENTS 3,296,168  1/1967  Jirik ................................ 260/29.6 R

OTHER PUBLICATIONS

Tekmar Company, "Dispersing with Original IKA".

Primary Examiner—Paul R. Michl
Attorney, Agent, or Firm—George A. Kap

[57] ABSTRACT

Method for homogenizing a monomer mix for making latexes, such as polyvinyl chloride latexes, comprising pumping the mix to a shearing means, shearing said mix by means of the rotating shearing means having multiple shearing surfaces while conveying it into rotating channels in the shearing means where the mix is subjected to centrifigal forces, conveying the mix from the rotating channels into stationary channels, repeating the preceding steps at least once, conveying the mix into a chamber which completes the first stage of a homogenizer, conveying the mix from the first stage through at least one more stage, recirculating the mix through the first stage and the additional stage or stages 3 to 25 times, and then conveying the mix to the polymerization reactor where the latex of improved colloidal stability is obtained as determined by a drastic reduction in polymer build-up on reactor interior and coagulum in the latex.

17 Claims, 2 Drawing Figures

METHOD FOR HOMOGENIZING MONOMER MIXES FOR VINYL LATEX PRODUCTION

BACKGROUND OF THE INVENTION

In the preparation of vinyl polymer and copolymer latexes of vinyl and vinylidene halides polymerized alone or with one or more copolymerizable monomers, a mix is used which, in a preferred embodiment, comprises vinyl chloride monomer, water, emulsifier, a long straight chain alcohol, and an initiator. This mix is initially premixed, then homogenized, and pumped to a polymerization reactor where the vinyl chloride monomer is polymerized by means of emulsion polymerization technique. Crude latex is formed in the polymerization reactor and successively conveyed to a blend tank where other ingredients are added with mixing, then to a concentrator where the crude latex is concentrated to 40% to 60% solids, and finally to a spray drier, if desired, where the latex is dried and formed into a particulate product. From the spray drier, the particulate product is ground and bagged.

The homogenizing procedure includes the step of passing the mix thrugh a two-stage Manton Gaulin (MG) homogenizer which is a positive displacement reciprocating pump operating at a low flow rate but at high pressure. In passing through a homogenizing stage of the MG homogenizer, the mix under pressure forces open a pre-loaded valve where the annular gap between the valve stem and the seat is about 3 to 4 mils. In passing through the gap, the mix undergoes instantaneous pressure drop causing shearing action and cavitation bubbles. In a two-stage MG homogenizer, the mix passes through two such valves with accompanying pressure drops. When leaving the first valve, the mix strikes an annular impact ring thus further shattering the particles by impact and implosion of the bubbles.

The MG homogenizer described above has three suction valves and three discharge valves which act as check valves. Poor homogenization by the MG apparatus is due mainly to polymer deposition on and around the valves which prevents them from fully opening and closing. This condition of the valves leads to a large decrease in flow rate which drastically reduces velocity through the homogenizing valve. This reduced velocity results in poor homogenization which is evidenced by larger droplets and longer than normal homogenization time. Large pressure fluctuations indicate problems of this nature.

Cavitation and turbulence are the two principal mechanisms of homogenization. Velocity determines intensity of cavitation and turbulence in direct relationship, i.e., the higher the velocity the higher cavitation and turbulence and the better homogenization. Reduced velocity, due to plugged valves, will, therefore, reduce quality of homogenization. Although shear plays a minor role in the MG homogenizer, it is, nevertheless, adversely affected by lower velocity. Cumulative effect of all of these factors is erratic homogenization and unpredictable colloidal stability, which makes it impossible to obtain vinyl latex with reproducible properties. Furthermore, the homogenization method, as presently carried out with MG homogenizer, makes it difficult to control plastisol viscosity to obtain reproducible results since more than two passes of the mix therethrough renders viscosity too high because latex particles are outside of the desired size range and the latex is colloidally unstable.

Colloidal stability of vinyl latexes is judged by the quantity of coagulum in the latex. With the customary emulsion polymerization processes, colloidally stable latexes are difficult to obtain since the latexes usually contain polymer particles of varying size too many of which are too fine or too large. Various proposals have heretofore been made to overcome this difficulty but not with the ultimate success. Most of the time, too much coagulation occurs with the resulting latex containing too much coagulum or partially agglomerated particles which precipitate thus reducing the yield. Inordinate quantity of coagulum in latex also clogs strainers downstream of the polymerization reactor, plugs spray-drying nozzles, and causes other difficulties. Clogging of strainers is a particularly vexing problem since the strainers must be opened for cleaning which releases vinyl chloride monomer into the environment thus, too often, creating EPA violations with respect to the maximum allowable quantity of vinyl chloride monomer in the plant environment.

Colloidal stability of vinyl latexes is also affected by the formation of undesirable polymer build-up on the inner surfaces of the polymerization reactor. This deposit or build-up of polymer on the reactor surfaces not only interferes with heat transfer but also decreases yield and adversely affects polymer quality by producing particles, too many of which are too fine or too large, with the resulting adverse effect on viscosity. This polymer build-up must be removed since, otherwise, more build-up occurs rapidly on top of the deposits already present resulting in a hard, insoluble crust.

In the past, it has been the practice to have an operator enter the reactor and scrape the polymer build-up off the walls, baffles and agitators. This operation was not only costly both in labor and in down-time of the reactor but presented potential health hazards as well. Various methods have heretofore been proposed to remove the polymer build-up, such as solvent cleaning, various hydraulic and mechanical reactor cleaners, and the like, but none has proved to be the ultimate in removal of polymer build-up.

In addition to the colloidal stability difficulties, prior art processes for making vinyl latexes by emulsion polymerization suffer from other disadvantages which include poor reproducibility of good quality latexes and lack of any control of viscosity. It is possible to produce good quality latexes with prior art processes, however, unanticipated periods of disastrous results often are encountered and large quantities of latex is produced which does not meet product specifications. Furthermore, due to strictures of the prior art practices, viscosity of the resulting latex can also suffer unpredictably.

SUMMARY OF THE INVENTION

This invention relates to the method for homogenizing a mix of a vinyl or vinylidene halide alone or in combination with one or more copolymerizable monomers, water, emulsifier, long straight chain alcohol, and initiator in the preparation of a latex by emulsion polymerization. The polymer latex prepared from monomer mixes homogenized by the method disclosed herein results in lower polymer build-up on interior of reactor and less coagulum in the latex, which is indicative of a latex of improved colloidal stability. This method comprises the steps of conveying the mix through the first stage of a homogenizer which includes shearing the mix as it is forced into a plurality of rotating channels and subjecting it to centrifugal force by the rotation of the channels at high rate, conveying the mix from the rotating channels into stationary channels, repeating the shearing and conveying steps at least once more, introducing the mix from the first stage into a first chamber, conveying the mix through at least one more stage, recirculating the mix through the homogenizer enough times to obtain a homogenized mix of desired quality before conveying it to a polymerization reactor where the latex is prepared.

DETAILED DESCRIPTION OF THE INVENTION

The high pressure low flow rate prior art method has now been displaced by a low pressure high flow rate method described herein. The prior art method was carried out by an MG positive displacement homogenizer whereas the novel method described herein is effected with a centrifugal homogenizer which produces effects of mechanical high frequency with a rotor/stator system at high peripheral speeds. The high degree of dispersion obtained with the novel homogenization method is due to a complex interaction of a number of shearing mechanisms whereby the turbulence created in the shearing gap and in the rotating and stationary channels plays a decisive role. Multi-dimensional speed fluctuations are produced which are coupled with high-frequency pressure fluctuations to provide latexes of vastly improved colloidal stability with reproducible results. The forces created by the rotor/stator system increase dissolution of the materials.

To facilitate understanding of the novel method for homogenizing monomer mixes, reference will now be made to schematic drawings of the apparatus that is capable of carrying out the method steps. Although the invention described herein is presented in the context of homogenizing a monomer mix, which may assume some form of pre-mixing to prepare the mix, this condition need not be present in actual practice of this invention. The method described and claimed herein is capable of producing a homogenized monomer mix starting with a pre-mixed mix or merely ingredients thereof in a tank which are fed directly to the homogenizer. This has been done by introducing ingredients of the monomer mix into a pre-mix tank and feeding these ingredients to the homogenizer without any agitation in the pre-mix tank. Colloidal stability of latexes prepared without pre-mix agitation was found to be as good as with pre-mix agitation.

It should be apparent that the approach without pre-mix agitation is very desirable since it eliminates the pre-mixing step and the attendant costs and complications. It is intended that the claims herein cover homogenizing method wherein either a monomer mix or its ingredients are introduced to the homogenizer.

Figure 1:
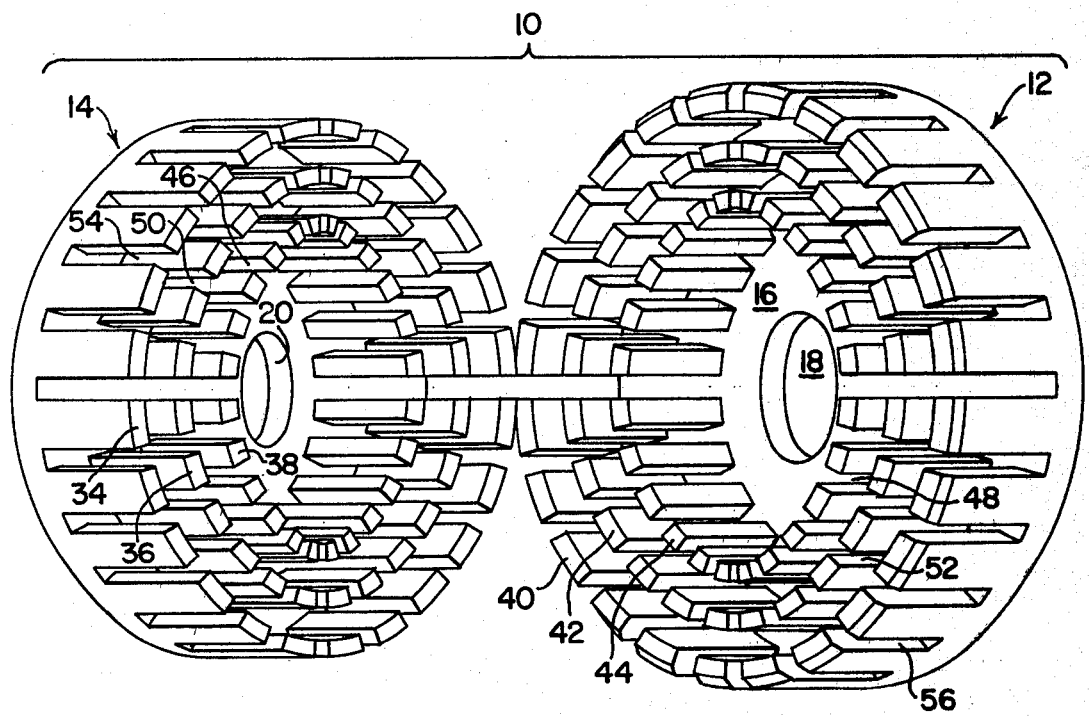
FIG. 1 illustrates a single stage of a centrifugal homogenizer consisting of a rotor and a stator in disassembled condition with three spaced concentric circular rows of teeth on the rotor which, in operating condition, are disposed in spaced relationship between the three rows of teeth on the stator.
Figure 2:
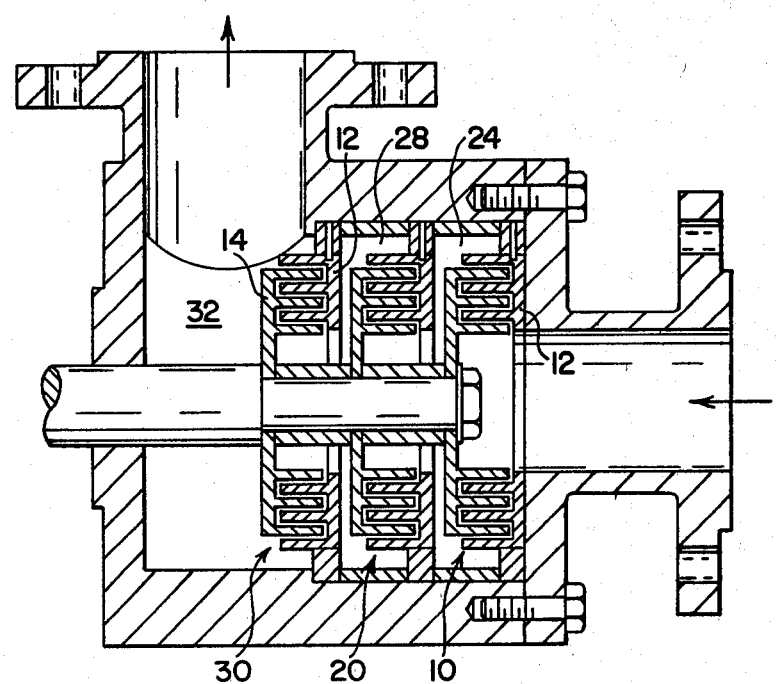
FIG. 2 depicts a 3-stage centrifugal homogenizer with each stage disposed on a horizontal axis spaced by closed-off chambers.

In FIG. 1, a single stage 10 of a homogenizer is shown in disassembled, inoperative arrangement which includes stator 12 and rotor 14. Stator 12 includes circular mounting disk 16 with a opening 18 therein through which a shaft passes. Opening 18 is larger in diameter than the shaft to permit the mix to flow in the unobstructed space created by the smaller shaft disposed in a larger opening, the space hereinafter at times referred to as a well. The stator is mounted in the homogenizer in a known manner to provide the described relationship. Rotor 14 is rotatably disposed on the shaft which passes through opening 20 in circular mounting disk 22. In the operating condition, the rotor fits within the stator in face-to-face relationship to form a single stage of the homogenizing unit shown in FIG. 2 where three such stages are mounted in series on the same shaft. The mix is introduced into opening 18 between the shaft of the first stage, from the direction indicated by the arrow shown in FIG. 2, and is then passed through the first stage 10 of the homogenizing unit and into chamber 24, then through second stage 26 and into chamber 28, and finally through third stage 30 into chamber 32. At least two stages are used to homogenize the mix for making vinyl latex, and preferably three stages. From chamber 32, the mix can be recycled through the homogenizing unit once or as many times as is deemed necessary, and then conveyed to the polymerization reactor where the vinyl latex is made.

Returning to FIG. 1, outside dimensions of the stator and rotor of a laboratory model homogenizer are about $2\frac{3}{8}''$ and $2\frac{1}{8}''$, respectively. The rotor shown has three rows of concentrically arranged teeth 34, 36 and 38 spaced from each other about $\frac{1}{4}''$ with spacing between teeth of nearly $\frac{1}{8}''$. Length of the teeth is about $\frac{1}{2}''$ and all teeth terminate in the same vertical plane disposed perpendicularly to the shaft. The stator also has three rows of concentrically arranged spaced teeth 40, 42 and 44 which have generally the same spacing between rows and teeth as the stator. The teeth on the stator and rotor are aligned radially outwardly one behind the other. In the operating condition, first row of teeth 34 of the rotor is disposed between rows 40 and 42 of the stator, second row of teeth 36 of the rotor is disposed between rows 42 and 44 of the stator, and the third row of teeth 38 of the rotor is disposed on the inside of row 44 of the stator, as determined in a radial direction. It should be apparent that sufficient clearances are provided between mating parts for relative rotation at very high rate.

This novel method will now be described in connection with the homogenizing apparatus illustrated in the drawings. The mix is initially introduced into the well in opening 18 of the first stage of the homogenizing apparatus. The well is disposed around the shaft and constitutes opening 18 which is unobstructed by the smaller diameter shaft with the third row of teeth 38 of the rotor disposed concentrically within the interior perimeter of the well. When the mix is introduced into the well, it is conveyed along the axis of the shaft and forced radially outwardly through rotating channels 46 of the third row of teeth 38 of the rotor which rotates at 5,000 to 10,000 rpm, preferably about 8,000 rpm. These figures are for the laboratory model. Channels 46 are formed by the spaced teeth in the third row 38 of the rotor. As the mix is forced into channels 46, it is subdivided into separate streams and is incrementally sheared by the rotating teeth at the rate of about 8,000 times each minute. While in channel 46 for an instant, the mix is also subjected to very high centrifugal forces which create turbulence, a desirable element in homogenization. The imposed pressure on the mix forces individual streams thereof from rotating channels 46 into stationary channels 48 formed by the teeth in the third row 44 of the stator where the mix is impacted against one wall thereof due to centrifugal forces imparted to the mix in the rotating channels 46. From stationary channels 48, individual streams of the mix are conveyed under pressure into rotating channels 50 formed by the second row of teeth 36, at which time the mix is subjected to the shearing action of the rotating teeth in the second row 36 of the rotor as the mix enters channels 50 as well as to the centrifugal forces of rotor 14. These method steps are repeated by having individual streams of the mix conveyed from rotating channels 50 sequentially into stationary channels 52 formed by the second row of teeth 42 of stator 12, then into rotating channels 54 formed by the first row of teeth 34 of rotor 14 and, finally into stationary channels 56 formed by the first row of teeth 40 of the stator.

It should be understood that any number of rows of teeth can be provided on the rotor and the stator although two rows on each is the minimum for practical applications. Experience has shown that the preferred number of rows of teeth on the rotor and stator is three. Likewise, spacing and extent of teeth can also be varied without departing from the spirit of this invention.

Issuance of the individual streams of the mix from stationary channels 56 concludes its passage through first stage 10 of the homogenizer. At this point, the mix is introduced into chamber 24 and then into the second stage 26 where the same method steps are repeated. From the second stage, the mix enters chamber 28, then into the third stage 30 of the homogenizer, and finally into chamber 32. Any number of stages can be used. Minimum number of stages is two although the preferred number, for purposes herein, is three.

The mix from chamber 32 can be recirculated through the homogenizer any number of times desired for optimum homogenization as determined by build-up of polymer on reactor interior, coagulum in the latex, viscosity of plastisol, and reproducibility of results. On the basis of experimental data, the mix should be recirculated 3 to 25 times through a three-stage homogenizer, preferably 5 to 15 times. It should be understood that a multiple number of homogenizers can be provided in series in order to accomplish the same result and thus reduce number of passes and time consumed for homogenizing a mix. From the homogenizer, the mix is conveyed to a polymerization reactor where the monomeric ingredients are polymerized and the crude latex is formed.

The mix is recirculated through a homogenizer to improve colloidal stability thereof. In the case of the MG homogenizer, it was found that colloidal stability of the mix can be improved by recycling it once or twice but it becomes poorer when recycled three times. After the first pass through the MG homogenizer, the sum of build-up and coagulum was about 0.5% which dropped to about 0.25% after the second pass and rose to almost 1% after the third pass. Effectiveness of the centrifugal homogenizer in reducing build-up and coagulum was dramatic. After about 5 to 6 passes, centrifugal homogenizer appears to be superior to the MG homogenizer in terms of build-up and coagulum and in improving charge-to-charge reproducibility. Beyond about 20 passes, build-up and coagulum are essentially eliminated by the use of centrifugal homogenizer although viscosity appears to increase, which is undesirable. The recirculating feature of the centrifugal homogenizer is critical since it provides not only flexibility and degree of control not possible with the MG homogenizer, but improved colloidal stability as well.

The mixes referred to herein are used to make polymer latexes which include those selected from homopolymers of vinyl halides and vinylidene halides, preferably vinyl chloride and vinylidene chloride, and latexes wherein a vinyl halide and vinylidene halide are polymerized with one another and/or with other monomers. Copolymer latexes are made from vinyl and/or vinylidene halides, such as vinyl chloride and vinylidene chloride, copolymerized with one or more comonomers such as $\alpha,\beta$-olefinically unsaturated carboxylic acids containing 3 to 5 carbon atoms, such as acrylic, methacrylic, ethacrylic and cyanoacrylic acids; monounsaturated dicarboxylic acids containing 4 to 8 carbon atoms, such as fumaric and maleic acids; esters of $\alpha,\beta$-olefinically unsaturated carboxylic acids containing 3 to 5 carbon atoms and monounsaturated dicarboxylic acids containing 4 to 20 but preferably 4 to 12 carbon atoms, such as methyl acrylate, ethyl acrylate, butyl acrylate, 2-ethylhexyl acrylate, octyl acrylate, ethyleneglycol dimethacrylate, diethylene glycol diacrylate, cyanoethyl acrylate, methyl methacrylate, butyl methacrylate, hydroxypropyl methacrylate, ethyl maleate, butyl fumarate, maleic dimethyl ester, maleic acid mono-(2-ethylhexyl) ester, fumaric acid diethyl ester, and fumaric acid dilauryl ester; $\alpha,\beta$-olefinically unsaturated nitriles containing 3 to 5 carbon atoms, such as acrylonitrile and methacrylonitrile; acrylamides derived from acrylic and methacrylic acids and their N-alkylol and N-alkoxyalkyl derivatives containing 3 to 20 but preferably 3 to 12 carbon atoms, such as acrylamide itself, methyl acrylamide, N-methylol acrylamide, N-butoxy methacrylamide, methylenebisacrylamide, methacrylamide, N-octyl acrylamide, diacetone acrylamide, and hydroxymethyl diacetone acrylamide; vinyl ethers containing 4 to 22 carbon atoms, such as ethyl vinyl ether, chloroethyl vinyl ether, isobutyl vinyl ether, cetyl vinyl ether, and lauryl vinyl ether; vinyl ketones containing 3 to 12 carbon atoms, such as methyl vinyl ketone; vinyl esters of carboxylic acids containing 4 to 22 carbon atoms, such as vinyl acetate, vinyl propionate, vinyl formate, vinyl stearate, vinyl benzoate, and vinyl and allyl chloroacetate; $\alpha$-olefins containing 2 to 12 carbon atoms, such as ethylene, propylene, isobutylene, and butene-1; and styrene and styrene derivatives such as $\alpha$-methyl styrene, vinyl toluene, and chlorostyrene; and other polyfunctional monomers such as vinyl naphthalene, vinyl pyridine, divinyl benzene, and allyl pentaerythritol.

Preparation of the latexes described herein is done by means of emulsion polymerization in an aqueous medium. Emulsifier system for this type of polymerization is preferably a combination of long straight chain alcohols of 6 to 24 carbon atoms and a sulfate or a sulfonate type soap.

The long straight chain alcohols, referred to above, are saturated alcohols containing from 6 to 24 carbon atoms. Examples of such alcohols are tetradecanol, pentadecanol, hexadecanol, heptadecanol, octadecanol, nonadecanol, eicosanol, heneicosanol, docosanol, tricosanol, and tetracosanol. Mixtures of the alcohols can be employed. For example, a 14 carbon alcohol and an 18 carbon alcohol. Also, lower carbon content alcohols can be employed when mixed with the longer chain alcohols. For example, a mixture of dodecanol and octadecanol. Amount of the long chain saturated alcohol, or a mixture of such alcohols, can vary from 0.01 to 5 parts by weight per 100 parts of the monomer charge.

Suitable emulsifiers include alkali metals or ammonium salts of long chain saturated fatty acids containing 8 to 20 carbon atoms. Excellent results have also been obtained with anionic emulsifiers such as alkali metal and ammonium salts of the sulfates of alcohols of 8 to 18 carbon atoms. Examples of such emulsifiers are sodium lauryl sulfate, ethylamine lauryl sulfate, alkali metal and ammonium salts of sulfonated petroleum and paraffin oils; sodium salts of hydrocarbon sulfonic acids; sodium salts of alphaolefin sulfonates; etc. Amount of the emulsifier or a mixture thereof can vary from 0.5 to 5 parts per 100 parts of the monomer charge.

The emulsion polymerization is commenced by the initiators which are present in an amount of 0.01 to 5 parts per 100 parts of the monomer charge. The useful initiators or catalysts include, for example, the various peroxygen compounds, such as lauryl peroxide, isopropyl peroxydicarbonate, bis(4-tert-butyl cyclohexyl) peroxydicarbonate, di(2-ethyl hexyl) peroxydicarbonate, diisononanoyl peroxide, benzoyl peroxide, t-butyl hydroperoxide, t-butyl peroxypivalate, cumene hydroperoxide, t-butyl diperphthalate, pelargonyl peroxide, 1-hydroxy cyclohexyl hydroperoxide, tert-butyl peroxyneodecanoate, and the like; azo compounds, such as azodiisobutyronitrile, dimethylazodiisobutyrate, and the like. It is preferred to use an activator for the initiator in order to accelerate the reaction rate. The activator is used in an amount of 0.0005 to 0.02 parts per 100 parts of the monomer charge and examples thereof include sodium nitrite, sodium borohydride, hydroxyl ammonium sulfate, 2,4-dinitrobenzene sulfonate sodium salt, sodium sulfite, sodium bisulfite, sodium formaldehyde sulfoxylate, and other similar materials.

In the practice of the present invention, the polymerization reaction is conducted at a pH of about 2 to 9. It should be understood, however, that pH is not critical in this reaction and can be varied depending on the desired properties of the final product.

Preparation of latex is conducted in the presence of a compound capable of initiating the polymerization reaction. Free radical yielding initiators, normally used for polymerizing olefinically unsaturated monomers, are satisfactory for use in the present process.

The initiators can be charged completely at the outset of the polymerization by adding them to the monomer premix with the other ingredients of the reaction mixture. In such a case, mixing is done prior to homogenization and introduction into the reactor. It is necessary, however, that the temperature during the premixing and homogenization steps be kept below the minimum temperature of reactivity of the particular initiator or initiators being employed. Temperature of the premix is generally in the range of 50° to 100° F., preferably about 70° to 80° F.

The temperature of the polymerization reaction is important since the intrinsic viscosity (IV) is a direct function of the temperature of the reaction. That is, the higher the temperature, the lower the IV. We have found that in order to obtain certain desired and improved properties, polymerization temperatures in the range of about 40° C. to about 65° C. are satisfactory. It should be noted that as the temperature of a reaction is increased, the polymer build-up increases. However, the build-up is not of the hard, crusty type and can readily be removed by rinsing or hosing down with water and without opening the reactor when appropriate spray nozzles are installed in the reactor.

Two representative monomer mixes for making a latex by emulsion polymerization are as follows, which are given in parts by weight:

| | | |
|---|---|---|
| demineralized water | 140 | 140 |
| vinyl chloride | 100 | 100 |
| long straight chain alcohol | 2 | 0.25 |
| sulfate salt of high fatty acid | 1 | — |
| alpha olefin sulfonate | — | 1 |
| initiator | 0.05 | 0.05 |

It should be understood that the above monomer mix can also include other conventional ingredients such as plasticizers, buffers, chelating agents, viscosity depressants, activators, antifoam agents, etc.

The polymer latexes described herein may be compounded with other known ingredients such as plasticizers, antioxidants or stabilizers, antifoaming agents, dyeing adjuvants, pigments, fillers, and other compounding aids. Furthermore, thickeners or bodying agents may be added to the polymer latexes to control viscosity thereof and thereby achieve the proper flow properties for the particular application desired.

A number of examples were conducted in order to compare quality of homogenization pursuant to the prior art practice, which is analogous to the positive displacement reciprocating pumping action, and the novel homogenization method described herein, which is similar to the centrifugal pump action. In carrying out the prior art method, the smallest 2-stage, 3-cylinder lab scale MG homogenizer was used whereas the smallest lab centrifugal homogenizer was used to carry out the novel method. These two homogenizers appear to be best suited for conducting comparison studies.

EXAMPLE 1

This experiment illustrates operation of the prior art homogenization.

A number of charges were homogenized using monomer mixes given above. The mixes containing lower content of straight chain alcohol also included diisononanoyl peroxide and di(2-ethylhexyl)peroxydicarbonate initiators. The mixes were agitated for about a quarter of an hour at about 20° C. and then homogenized in a two-stage MG homogenizer, the first stage being set at 600 psig and the second, at 700 psig. The 15-gallon polymerization reactor was evacuated prior to the addition of the premix thereto and heated to the reaction temperature of 45° C. when the premix was introduced. Polymerization was conducted at about 45° C. and upon completion, the polymer latex was removed and spray dried. Some of the variables and results are given in the table, below:

TABLE I

| | Charge 1 | Charge 2 | Charge 3 | Charge 4 |
|---|---|---|---|---|
| Premix Pressure, psig | 55 | 55 | 55 | 55 |
| Recycle Time, min. | Control | 18 | 36 | 54 |
| Discharge Pressure[1], psig | 1300 | 1300 | 1300 | 1300 |
| Homogenization Time, min. | 20 | 17 | 18 | 18 |
| No. of Turnovers | 0 | 1 | 2 | 3 |

TABLE I-continued

|  | Charge 1 | Charge 2 | Charge 3 | Charge 4 |
|---|---|---|---|---|
| Reaction Time, hrs. | ~14 | 13.75 | 13.25 | 14.0 |
| % VCl Build-up | 1.56 | 0.52 | 0.23 | 0.95 |
| % Coagulum | 0.06 | 0.06 | 0.04 | 0.0 |
| Total, BU and Coagulum | 1.62 | 0.58 | 0.27 | 0.95 |
| % Latex Solids | 36.0 | 37.0 | 37.5 | 35.0 |
| Latex Particle Size, d50μ | 0.74 | 0.58 | 0.62 | 0.55 |
| 1-Day Plastisol Visc., cps | 87,500 | 270,000 | 220,000 | 80,000 |

[1]discharge pressure from homogenizer

The data, above, indicates a sharp drop in the level of build-up and coagulum when turnovers of premix is increased from zero to one and then to two. Three turnovers, howver, shows an increase in the level of build-up and coagulum. This is, apparently, an indication of overhomogenization which results in less stable emulsion droplets. Although build-up and coagulum dropped sharply after turnover one and two, it should be noted that plastisol viscosity increased substantially, which is detrimental. The plastisols were prepared by admixing 62 parts plasticizer per 100 parts of PVC resin.

EXAMPLE 2

This experiment illustrates homogenization using the centrifugal homogenizer operated pursuant to the method claimed herein.

Over 50 charges were homogenized using the monomer mixes described above. The mixes were prepared and polymerized as described in Example 1, the only significant difference being the use of a laboratory scale centrifugal homogenizer and the use of 30-gallon as well as the 15-gallon polymerization reactors. Although reactor coating and water injections were used, most polymerizations were conducted without either. Some of the variables and results are presented in the table, below:

TABLE II

| No. of Turnovers | 1-23 |
|---|---|
| Flow Rate, gpm | 1-16 |
| H₂O Level | 100-165 |
| No. Charges Since Cleaning | 1-4 |
| No. Charges Since Rinsing | 1-4 |
| Catalyst Type | A,B[1] |
| % Coagulum | 0 - coarse |
| % Build-up | 0 - coarse |
| Particle Size, d50μ | 0.5-2.2 |
| Plastisol Visc., 1-day | 6450-50,000 cps |

[1]A - diisononanoyl peroxide
B - t-butyl peroxypivalate

The results obtained with the centrifugal homogenizer indicate that, although build-up and coagulum can vary from zero to coarse, it is possible to obtain performance with essentially zero percent build-up and coagulum. Furthermore, plastisol viscosity is also very low, which is highly desirable. Even at 50,000 cps, plastisol viscosity is below that obtained for any of the plastisols of Example 1. Plastisols in this example were prepared as described in Example 1.

EXAMPLE 3

This experiment presents comparison data for the MG prior art homogenizer, versus the centrifugal homogenizer operated pursuant to the method disclosed and claimed herein. A total of over one hundred charges were run.

The MG homogenizer was operated at a pressure of about 1300 psig and a flow rate of about 0.7 gpm whereas the centrifugal 3-stage homogenizer was operated at 65 to 70 psig and a flow rate of about 10 gpm.

A large number of mixes were homogenized using the MG and centrifugal homogenizers at varying turnovers or recycles which were then conveyed to polymerization reactor where the monomer charge was emulsion polymerized. Residue build-up on interior of the reactor and coagulum in the latex were then measured. The formulation used herein corresponded, in parts by weight, to the formulation previously disclosed or slight variations thereof. Size of the particles going into the reactor was generally in the range of 0.09 to 0.1 micron. The following table shows average percent build-up and coagulum, based on the monomer charge, for the MG and the centrifugal homogenizers used to homogenize mixes which were subsequently polymerized in 15-gallon and 30-gallon polymerization reactors:

TABLE III

|  | % Build-up Plus Coagulum | Std. Deviation |
|---|---|---|
| Centrifugal | 0.18 | ±0.11 |
| MG | 0.78 | ±0.56 |

The above table shows percent build-up and coagulum with a 1-standard deviation. The data reflects vast disparity between the two homogenizers. Whereas the sum of build-up on interior of reactor and coagulum in the latex was an average of 0.18% for centrifugal homogenizer, the corresponding figure for the MG homogenizer was 0.78%. More recent data gives average percent build-up and coagulum of 0.20% for the centrifugal homogenizer and 0.55% for the MG homogenizer.

Another very significant factor pertaining to the table above is the 1-standard deviations for the build-up and coagulum values. The deviation for the centrifugal homogenizer was 0.11% whereas for MG it was 0.56%. There is more than a five-fold difference here which reflects reproducibility of results, a very critical factor in the PVC production.

Table III, above, shows a very large decrease in build-up and coagulum when centrifugal method was used to homogenize the monomer charge. Table III also shows very poor reproducibility of results, in terms of colloidal stability, for the reciprocating method, as evidenced by the very large standard deviation. These conclusions also apply to polymer latexes made in reactors having coated walls to reduce polymer build-up and to latexes made in uncoated reactors. The degree of improvement, of course, is greater when reactors with coated walls are used.

By application of the centrifugal homogenization method described herein, it is possible to have a higher loading of the monomer(s) in the mix than with the reciprocating MG homogenization method. This, of course, means higher productivity. The table below illustrates this point by showing quantity of water used in parts per 100 parts of the monomer charge, the type of method used to homogenize monomer mixes and number of passes through the centrifugal homogenizer. The mix was passed once through the MG homogenizer. The same formulation was used in both methods. The following data were obtained, which are given in the table, below:

TABLE IV

| Water | No. of Passes | % Build-up & Coagulum | |
|---|---|---|---|
|  |  | Centrifugal | Reciprocating (MG) |
| 140 | 7.7 | 0.23 | 0.47 |

TABLE IV-continued

| | | % Build-up & Coagulum | |
|---|---|---|---|
| Water | No. of Passes | Centrifugal | Reciprocating (MG) |
| 120 | 7.7 | 0.23 | 1.62 |
| 110 | 7.7 | 0.43 | 2.82 |
| 100 | 23 | 0.11 | thick |

The dramatic performance of the centrifugal method is evident from the above table where quantity of water in the mixes was reduced from 140 phm to 100 phm and yet percent build-up and coagulum dropped to 0.11% with 23 passes. With the reciprocating MG method, the mix thickened at 100 parts water per 100 parts monomer, rendering it useless.

The lab scale reciprocating and centrifugal homogenizers mentioned above were used to carry out the experiments herein. The lab scale reciprocating homogenizer can be operated at pressures of 1000 to 3000 psig and at flow rates of about 0.5 to 1 gallon per minute. The reciprocating homogenizer was operated at about 1500 psig and about 0.7 gpm during the course of the experiments herein. The centrifugal homogenizer can be operated at 50 to 100 psig and at flow rates of 5 to 15 gpm. During testing herein, it was operated at about 70 psig and at about 10 gpm. The lab scale centrifugal homogenizer has rotor/stator assemblies wherein the rotors rotate at 5,000 to 10,000 rpm. The rotors were operated at about 8,000 rpm to carry out the experimental work described herein.

Commercial or plant-size reciprocating MG homogenizers can operate at 1000 to 3000 psig, preferably about 1500 psig, and at flow rates of 20 to 100 gpm, preferably about 60 gpm. This compares to commercial centrifugal homogenizers that can operate at 25 to 200 psig, preferably about 50 to 120 psig, at flow rates of 100 to 300 gpm, preferably about 250 gpm. Rotors in plant-size centrifugal homogenizers rotate at about 600 to 4,000 rpm, preferably about 1800 rpm.

As should be apparent from the information given in the preceding paragraphs, flow rate through the centrifugal homogenizer can be much higher than what it is through the MG homogenizer. This, of course, means that recirculation of the mixes through the centrifugal homogenizer can be accomplished much quicker without increasing homogenization time in spite of more passes therethrough.

We claim:

1. A method for homogenizing a monomer mix for making a latex, said mix containing ingredients selected from vinyl halide, vinylidene halide, mixtures thereof, mixtures thereof with one or more copolymerizable monomers, and other ingredients, said method comprises passing said mix through a first stage of a homogenizer which includes the steps of shearing the mix by means of a rotating shearing means as the mix is forced into a plurality of centrifugally rotating channels in the shearing means, conveying the mix from the rotating channels into stationary channels, repeating the shearing and the conveying steps at least once through successive rotating and stationary channels, conveying the mix from the first stage to a polymerization reactor where the latex is prepared.

2. Method of claim 1 including the step of conveying the mix from the first stage through at least one more stage before conveying the mix to the polymerization reactor.

3. Method of claim 2 including the step of conveying the mix from each stage into a chamber before conveying it to the next stage.

4. Method of claim 3 including the step of recirculating the mix through the stages before conveying it to the polymerization reactor.

5. Method of claim 4 wherein the shearing and conveying steps in a single stage are repeated at least two times before the mix is conveyed to the next stage.

6. Method of claim 5 wherein the mix is conveyed through at least two stages before it is conveyed to the polymerization reactor.

7. Method of claim 6 wherein the mix is recirculated 3 to 25 times through the stages before it is conveyed to the polymerization reactor, the rotating and stationary channels being disposed adjacent one another.

8. Method of claim 6 wherein the mix is recirculated 5 to 15 times through the stages before it is conveyed to the polymerization reactor.

9. Method of claim 7 wherein the mix is recirculated through the stages at 100 to 300 gallons per minute at a pressure of 25 to 200 pounds per square inch gauge with the shearing means rotating at about 600 to 4,000 revolutions per minute.

10. Method of claim 9 wherein the mix is recirculated through the stages at about 250 gpm at a pressure of about 150 to 120 psig.

11. Method of claim 9 wherein said copolymerizing monomers are selected from $\alpha,\beta$-olefinically unsaturated carboxylic acids containing 3 to 5 carbon atoms, monounsaturated dicarboxylic acids containing 4 to 8 carbon atoms, esters of $\alpha,\beta$-olefinically unsaturated monocarboxylic and dicarboxylic acids containing 4 to 20 carbon atoms, $\alpha,\beta$-olefinically unsaturated nitriles containing 3 to 5 carbon atoms, acrylamides derived from acrylic and methacrylic acids and their N-alkylol and N-alkoxyalkyl derivatives containing 3 to 20 carbon atoms, vinyl ethers containing 4 to 22 carbon atoms, vinyl ketones containing 3 to 12 carbon atoms, vinyl esters of carboxylic acids containing 4 to 22 carbon atoms, alpha olefins containing 2 to 12 carbon atoms, and styrene and styrene derivatives.

12. Method of claim 11 wherein said mix comprises a monomer charge selected from vinyl halide, vinylidene halide, mixtures thereof, and mixtures thereof with one or more copolymerizable monomers selected from acrylates and acetates; demineralized water; a long straight chain alcohol; emulsifier; and initiator.

13. Method of claim 12 wherein said mix can be polymerized to produce polymer latex resulting in lower polymer build-up on interior of polymerization reactor and lower coagulum in the latex, said mix comprises, per 100 parts monomer charge, 0.01 to 0.5 part free-radical yielding initiator, 0.0005 to 0.02 part activator for said initiator, 0.5 to 5 parts emulsifier, and 0.01 to 5 parts long chain saturated alcohol or a mixture thereof.

14. Method of claim 13 wherein the shearing means and the shearing channels are rotated at about 1800 rpm and the mix is recirculated at a pressure of about 50 to 120 psig.

15. Method of claim 2 including the step of passing the mix through a plurality of homogenizers arranged in series before conveying the mix to the polymerization reactor.

16. Method of claim 4 including the step of passing the mix through a plurality of homogenizers arranged in series before conveying the mix to the polymerization reactor, the mix is selected from vinyl chloride, vinylidene chloride, mixtures thereof, and mixtures with one or more copolymerizable monomers selected from acrylates and acetates.

17. Method of claim 13 wherein the homogenized mix conveyed to the polymerization reactor has an average particle size on the order of about 0.1 micron.

* * * * *